C. H. BUTLER.
STREET SWEEPING TRAILER.
APPLICATION FILED NOV. 24, 1913.
1,110,531. Patented Sept. 15, 1914.
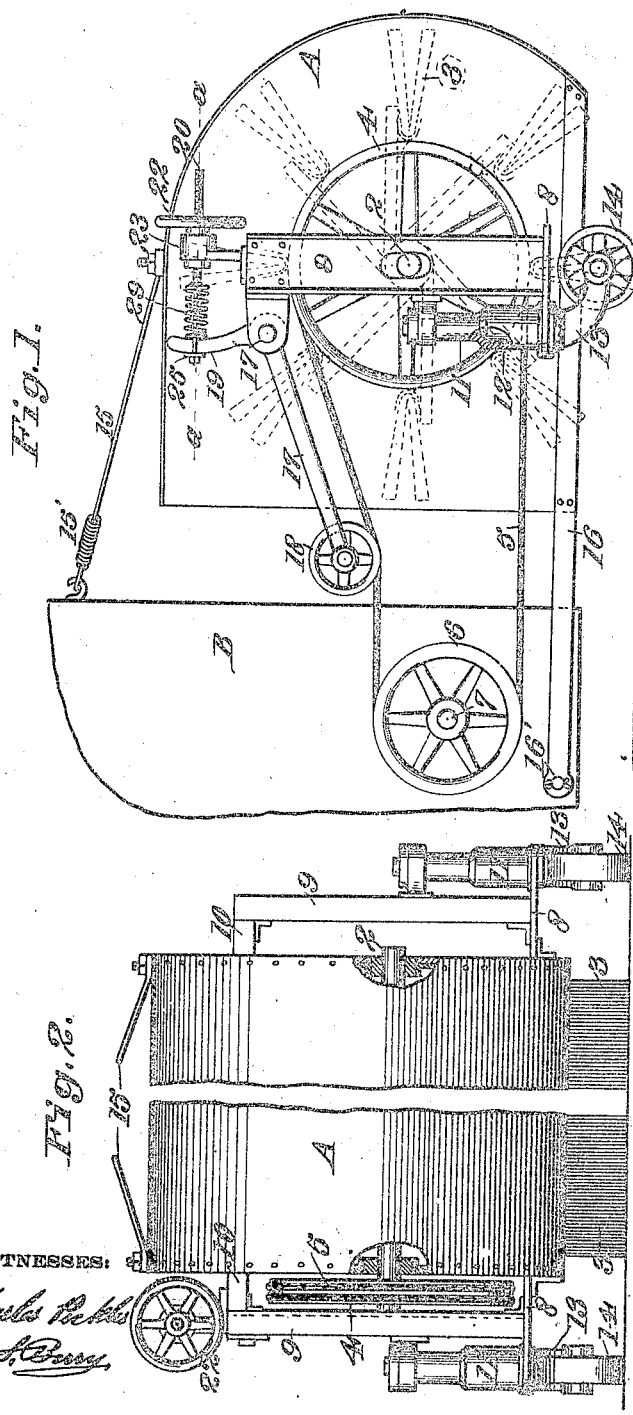
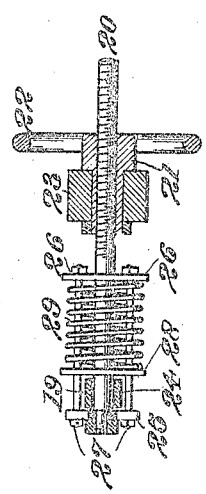
WITNESSES:
INVENTOR
Charles H. Butler,
BY G. H. Stving
ATTORNEY

UNITED STATES PATENT OFFICE.

CHARLES H. BUTLER, OF OAKLAND, CALIFORNIA.

STREET-SWEEPING TRAILER.

1,110,531.　　　　Specification of Letters Patent.　　Patented Sept. 15, 1914.

Application filed November 24, 1913. Serial No. 802,622.

*To all whom it may concern:*

Be it known that I, CHARLES H. BUTLER, a citizen of the United States, residing at Oakland, in the county of Alameda and State of California, have invented new and useful Improvements in Street-Sweeping Trailers, of which the following is a specification.

This invention relates to a broom-carrying trailer for street sweepers.

It is the object of this invention to provide a street sweeping trailer adapted to be pivotally connected to the rear end of a vehicle and having a rotary broom operable from a motor or other power generator on the vehicle.

Another object is to mount the trailer in such manner that the revolving broom will enter depressions on the road surface and thereby enable the sweeping of uneven or irregular surfaces, and to provide means for stabilizing the trailer and preventing it from bouncing when traversing rough roadways or crossing street railways and other projections and depressions in the street, and thus maintain the broom in contact with the road surface at all times.

Other objects will appear hereinafter.

The invention primarily resides in a revoluble broom mounted within a housing, the axis of which broom is in vertical alinement with the horizontal axes of caster wheels on which the housing is supported, means for connecting the housing to the rear end of the vehicle, means for rotating the broom from a source of power carried by the vehicle, and means operating on the power-transmission means for cushioning the housing and broom when traveling over uneven surfaces.

The invention further consists of the parts and the construction and combination of parts as hereinafter more fully described and claimed, having reference to the accompanying drawings, in which—

Figure 1 is a side elevation of the invention, with parts broken away. Fig. 2 is a rear elevation with parts removed. Fig. 3 is an enlarged detail section on the line A—A of Fig. 1.

In the drawings A indicates the housing of a trailer which is open at its front end and on its underside. Extending longitudinally through the housing A is a shaft 2 on which a rotary broom 3 is rigidly mounted. The shaft 2 is journaled in suitable bearings on the end of the housing A, and has a pulley wheel 4 mounted on one of its ends over which a rope-belt 5 is rove; the belt 5 passing around a drive pulley 6, on a shaft 7, mounted on a vehicle B of any suitable description. The shaft 7 is designed to be rotated from any source of power to transmit rotary motion to the broom 3, through the rope-belt 5 and pulley wheel 4.

Mounted on the ends of the housing A are horizontally-extending brackets or plates 8 to which are attached channel-iron uprights or standards 9 connected at their upper ends to the housing A by means of brackets 10. Journaled in bearings 11, carried on the brackets 8, are spindles 12 having yokes 13 on their lower ends in which wheels 14 are revolubly mounted; the wheels 14 have their horizontal axes normally alined with the axis of the broom-carrying shaft 2 and paralleling the latter. The wheels 14 form the running gear on which the housing A of the trailer travels.

By positioning the spindles 12 forward of the vertical axis of the shaft 2 and disposing the wheels 14 with their axes in alinement with the axis of the shaft 2, the broom 3 will, when rotated, be caused to move into contact with the road-bed on a line coinciding with the point of contact of the periphery of the wheels with the road surface, thus insuring the contact of the broom with the road-bed when the wheels 14 travel into depressions or over uneven surfaces, and enabling the thorough sweeping of the surface traversed by the trailer.

The housing A is attached at its upper portion to the vehicle body B by means of links or rods 15 which are divided into two parts connected together by spiral springs 15', to permit of a slight backward and forward movement of the upper portion of the housing A in relation to the vehicle body B. The lower portion of the housing A has forward projecting arms 16 which extend on opposite sides of the vehicle body B and are pivotally connected to trunnions 16' on the latter. The housing A on the wheels 14 forms a trailer which may be attached to any vehicle.

Means are provided for maintaining the rope-belt 5 taut, which also serves to steady the trailer and prevents excessive rocking movement, and tends to maintain the axis of the broom in the same vertical plane with the horizontal axes of the caster wheels 14. This means is here shown as consisting of an arm 17 connected to a rock-shaft 17', journaled in bearings carried on the upper end of one of the uprights 9, a wheel 18 on the outer end of the arm 17 adapted to bear against the upper run of the belt 5, an upwardly-extending arm 19 on the shaft 17' and an adjusting bar 20 operating between the arm 19 and one of the uprights 9. The bar 20 is threaded at its outer end and is screwed into an internally-threaded hub 21, formed on a hand-wheel 22, journaled in a bearing 23 on the upper end of the upright 9.

The connection between the rod 20 and the arm 19 is as follows: The upper end of the arm 19 is formed with a slot 24, through which the end of the rod 20 passes, as shown in Fig. 3, and attached to the end of the rod 20, in front of the arm 19, is a plate 25 which is connected with a plate 26 rearward of the arm 19 by bolts 27.

Interposed between the plate 26 and a similar plate 28, bearing against the rear face of the arm 19, is a spring 29 which serves to form a resilient connection between the rod 20 and the arm 19 so that the latter may have a yieldable rearward movement in relation to the bar 20. By operating the hand-wheel 22 the bar 20 may be advanced or retracted to adjust the arms 19 and 17 and cause the wheel 18 to bear upon the upper run of the belt 5 with any desired degree of pressure and thereby maintain the belt 5 taut. The yieldable connection between the rod 20 and the arm 19, obtained by the use of the spring 29, permits of a forward rocking movement of the upper portion of the housing A without causing excessive strains on the belt 5; the spring 29 tending to right the housing A and to normally maintain it with the axis of the shaft 2 and the axes of the wheels 14 in vertical alinement with each other. This is important in that the proper relation of the broom and the wheels 14 will be maintained when the trailer is being drawn over uneven or irregular surfaces. In some instances it may be desirable to mount the wheels 14 other than on swiveled yokes 13, it being important however to arrange the wheels 14 with their axes on the same vertical plane as the axis of the broom when the trailer is being moved in a forward direction.

Having thus described my invention, what is claimed and desired to secure by Letters Patent is:

In a street sweeper, a vehicle, a driving pulley thereon, a trailer housing having pivoted connection to the vehicle, a rotary brush in the housing, a driving belt for the brush passing around said driving pulley, vertical uprights secured to the sides of said housing, caster wheel supports for the housing carried by the uprights and having their axes in vertical alinement with the axis of said brush, means for maintaining the housing in a vertical position, said means comprising a bell crank lever pivoted to one of said uprights, a wheel carried by one arm of said lever and engaging the belt, a bearing mounted on the upper end of said last mentioned upright, a threaded rod passing through said bearing and secured to the other arm of the lever, resilient means between said arm and said bearing, and a hand wheel for advancing or withdrawing said rod.

In testimony whereof I have hereunto set my hand in the presence of two subscribing witnesses.

CHARLES H. BUTLER.

Witnesses:
JOHN H. HERRING,
W. W. HEALEY.